(12) United States Patent
Berry et al.

(10) Patent No.: US 9,756,703 B1
(45) Date of Patent: Sep. 5, 2017

(54) LIGHTING CONTROL SYSTEM AND METHOD FOR COMMUNICATION OF SHORT MESSAGING

(71) Applicant: Universal Lighting Technologies, Inc., Madison, AL (US)

(72) Inventors: Travis L. Berry, Madison, AL (US); John Cavacuiti, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 439 days.

(21) Appl. No.: 14/476,716

(22) Filed: Sep. 3, 2014

Related U.S. Application Data

(60) Provisional application No. 61/875,193, filed on Sep. 9, 2013.

(51) Int. Cl.
*H05B 37/02* (2006.01)

(52) U.S. Cl.
CPC .............................. *H05B 37/0218* (2013.01)

(58) Field of Classification Search
CPC ............ H05B 37/0272; H05B 37/0218; H05B 37/0227; H05B 33/0854; H05B 37/0281; H05B 33/0845; H05B 33/0863; H05B 37/0254; H05B 33/0803; H05B 33/0815; H05B 33/0842; H05B 37/0263; H05B 33/0872; H05B 37/0245; H05B 37/029
USPC ........ 315/159, 291, 307, 308, 297, 149, 312
See application file for complete search history.

(56) References Cited

U.S. PATENT DOCUMENTS

| | | | |
|---|---|---|---|
| 6,297,734 B1 * | 10/2001 | Richardson | G06K 7/0008 340/10.2 |
| 8,009,042 B2 | 8/2011 | Steiner et al. | |
| 8,214,061 B2 | 7/2012 | Westrick, Jr. et al. | |
| 8,731,689 B2 * | 5/2014 | Platner | H05B 37/0245 315/312 |
| 2006/0044152 A1 * | 3/2006 | Wang | H04L 12/2803 340/2.24 |
| 2009/0278479 A1 * | 11/2009 | Platner | H05B 37/0245 315/312 |
| 2010/0052576 A1 * | 3/2010 | Steiner | H05B 37/0227 315/361 |
| 2011/0001438 A1 * | 1/2011 | Chemel | H05B 37/029 315/297 |

(Continued)

*Primary Examiner* — Douglas W Owens
*Assistant Examiner* — Amy Yang
(74) *Attorney, Agent, or Firm* — Patterson Intellectual Propery Law, P.C.; Mark J. Patterson; Gary L. Montle

(57) ABSTRACT

An area lighting control system is provided for a light fixture and occupancy sensors. In a pairing mode, the occupancy sensors transmit messages with respective unique addresses to the light fixture, which identifies an associated sensor network. Upon lapsing of the pairing mode, an operating mode follows during which the sensors transmit output signals representative of occupancy in the area, and the light fixture regulates respective light sources based on an occupancy state determined according to output signals received from the associated network. The output signals are transmitted according to pseudo-random time intervals in order to reduce wireless transmission collisions, and only upon determining no occupancy in the defined area. When signals are received from all sensors in the network during a predetermined time period, the light fixture dims the light sources, whereas otherwise the light fixture operates the light sources at full lighting state.

13 Claims, 2 Drawing Sheets

(56) References Cited

U.S. PATENT DOCUMENTS

| | | |
|---|---|---|
| 2011/0245938 A1 | 10/2011 | Picco |
| 2012/0080944 A1* | 4/2012 | Recker .................... H02J 9/02 307/25 |
| 2014/0001963 A1 | 1/2014 | Chobot et al. |

* cited by examiner

LIGHTING CONTROL SYSTEM AND METHOD FOR COMMUNICATION OF SHORT MESSAGING

A portion of the invention of this patent document contains material that is subject to copyright protection. The copyright owner has no objection to the reproduction of the patent document or the patent invention, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 61/875,193, filed Sep. 9, 2013, and which is hereby incorporated by reference.

BACKGROUND OF THE INVENTION

The present invention relates generally to lighting control systems. More particularly, the present invention relates to a lighting control method wherein a light fixture identifies output signals from an associated occupancy sensor network and regulates a lighting state based on determined occupancy in a defined area.

Due to the improvements in LED lighting technology, the potential energy savings and legislation by the states and the U.S. Department of Energy, the lighting industry is increasingly moving toward controllable lighting. Controllable lighting systems typically employ wired connections to support communication between the controllers and the devices being controlled (e.g., DALI, 0-10V). This poses a cost problem for retrofits where the control wires are not already in place. While the cost is relatively less, the same problem exists in new construction where the wires must be procured and routed.

Alternative lighting control techniques include the use of power line control or wireless control. Power line control is susceptible to influence from noise and, in some implementations, requires bulky controls.

Wireless lighting controls have been employed on a limited basis, and typically use bi-directional messaging on relatively expensive platforms. The protocols include error correction and support multiple types of messages. Many of these conventional systems operate on a mesh network. While these systems are powerful in their ability to transmit a significant amount of data, the devices employed are expensive; the software development is often significant; and system commissioning and troubleshooting are complex.

Transmitting large amounts of data requires the use of unlicensed wireless bands that allow continuous data transmission (2.4 GHz). However, continuous data wireless bands are limited in their output power compared to unlicensed wireless bands targeted for spurious data transmission with very low duty cycle (400 MHz).

Further, many of the available wireless technologies are problematic in that they require significant research and development to implement them, they require skills typically unfamiliar to individuals installing lighting systems (e.g., network technology), and/or they are often difficult to troubleshoot (e.g., determine which device is failing).

It would therefore be desirable to provide a lighting control system that is fast and easy to commission, easy to troubleshoot, and relatively inexpensive.

It would further be desirable to provide a robust lighting control system that is substantially immune to noise.

It would further be desirable that the system is configured to embody a failsafe, wherein for example in fault conditions, the lights default to a full bright condition.

BRIEF SUMMARY OF THE INVENTION

A system and method as described herein has the potential to be relatively inexpensive, easy to commission and easy to trouble shoot.

In one embodiment, an exemplary lighting system as disclosed herein includes a light fixture having a light source and a controller. A plurality of occupancy sensors are associated with the light fixture and are configured to generate output signals representative of occupancy in a defined area. The controller for the light fixture is configured to operate the light source in either of a first lighting state upon identifying output signals as received from any each of the associated occupancy sensors within a predetermined time period, and a second lighting state upon identifying output signals as received from less than each of the associated occupancy sensors within the predetermined time period.

In one exemplary aspect of a system and method according to the present invention, a user may initiate a pairing mode, wherein the one or more occupancy sensors respectively generate a message comprising a unique address. The controller for the light fixture identifies each of the one or more occupancy sensors as being associated with the light fixture based upon the addresses received during the pairing mode. Upon lapsing of the pairing mode, an operating mode is initiated wherein the occupancy sensors generate the output signals representative of occupancy in the defined area. The light fixture operates the light source in the first or second lighting states based on the identified output signals from the one or more associated occupancy sensors.

In another exemplary aspect of a system and method according to the present invention, the occupancy sensors are respectively configured to transmit the output signals according to a pseudo-random time interval so that wireless transmission collisions may be reduced.

In another exemplary aspect of a system and method according to the present invention, the occupancy sensors only transmit output signals to the light fixture upon determining no occupancy in the defined area. The first lighting state provides a disabled or dimmed lighting output by the light source and the second lighting state provides full lighting output by the light source.

In another exemplary aspect of a system and method according to the present invention, the light fixture may be configured to continuously determine identification of each associated occupancy sensor within each of sequential predetermined time windows.

In another exemplary aspect of a system and method according to the present invention, the controller for the light fixture may be configured to count a number of occupancy sensors from which output signals are received during each of the sequential predetermined time windows, and to compare the number against a predetermined number of associated occupancy sensors in order to determine an appropriate lighting state for the light fixture.

In another exemplary aspect of a system and method according to the present invention, a transmission protocol for the occupancy sensors may include a point-to-point wireless network, or alternatively a mesh network.

In another exemplary aspect of a system and method according to the present invention, as an alternative to implementation of the pairing mode, the light fixture may be programmed for a particular lighting zone, and identify output signals as received from occupancy sensors assigned to the same lighting zone. The light fixture may be configured with a hardware interface to selectably define the lighting zone for the light fixture, and/or a hardware interface configured to selectably define a number of occupancy sensors in the lighting zone and associated with the light fixture.

In another exemplary aspect of a system and method according to the present invention, the controller for the light fixture may further configured to count a number of occupancy sensors from which output signals are received, and to compare the number against the defined number of associated occupancy sensors in the lighting zone in order to determine an appropriate lighting state for the light fixture.

In another aspect, a low duty cycle transmission may be implemented which allows for higher output power and longer range than continuous data systems.

DETAILED DESCRIPTION OF THE INVENTION

Figure 1:
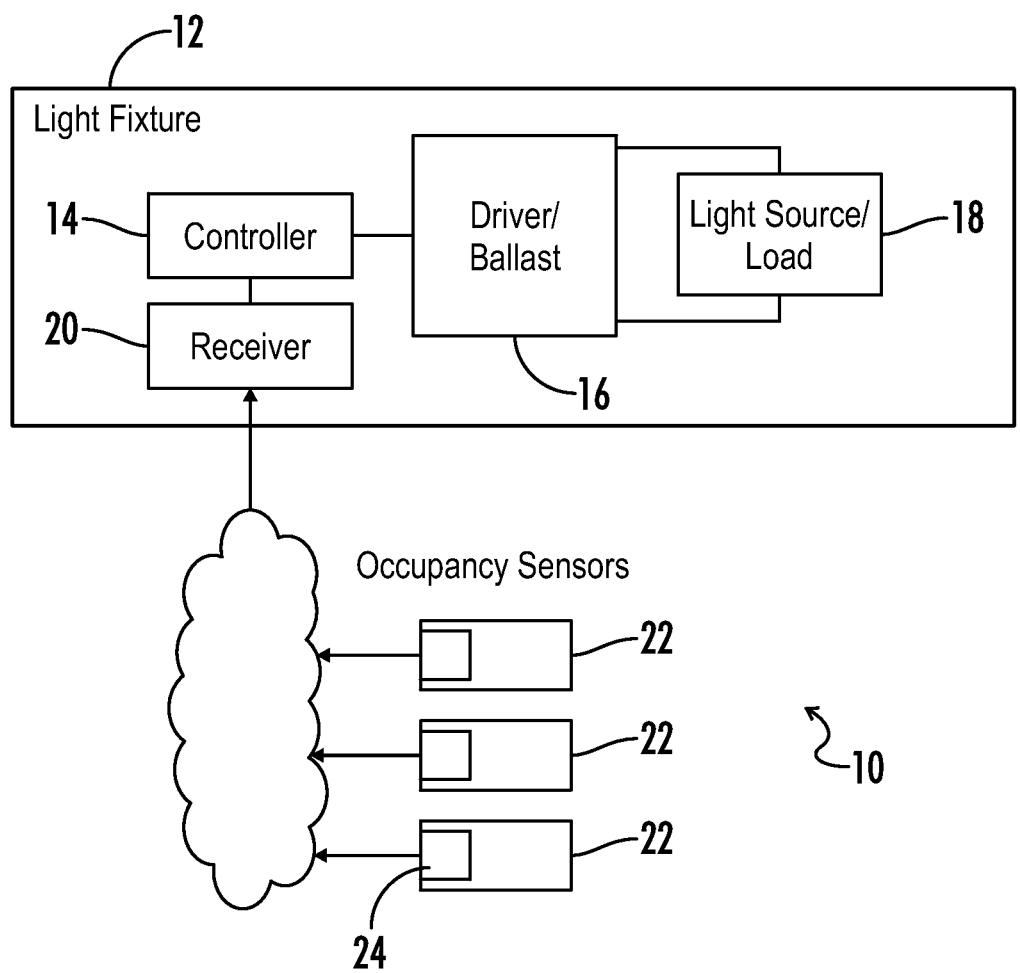
FIG. 1 is a block diagram representing an exemplary lighting system according to an embodiment of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Figure 2:
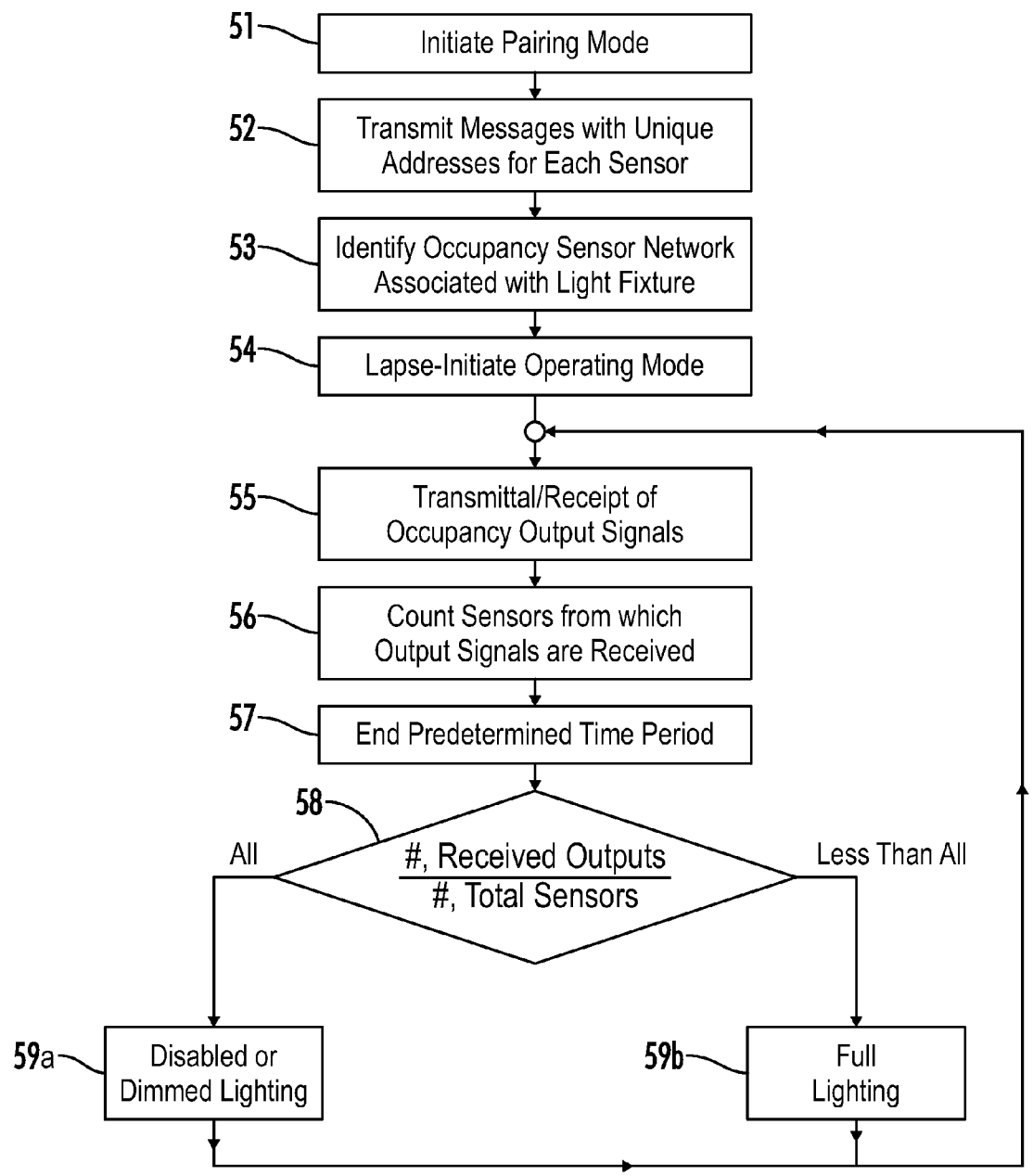
FIG. 2 is a flowchart representing an exemplary lighting control method according to an embodiment of the present invention.

Referring generally now to FIGS. 1 and 2, embodiments of a lighting system 10 and lighting control method according to the present invention may now be described.

In one exemplary embodiment, such a system and method includes one or more light fixtures 12 along with one or more external occupancy sensors as control devices 22, each equipped with a transmitter 24. The light fixture 12 further includes an internal controller 14, a ballast or driver circuit 16 and a light source 18. A light fixture 12 as described herein could use any light source 18 but one of skill in the art may contemplate that practical application of a system as disclosed herein would likely exclude traditional HID, given the time required for hot re-strike and limited capability to dim. The light fixture 12 includes a receiver 20 capable of receiving a signal from the transmitter(s) 24.

An exemplary occupancy sensor 22 may include a photocell, passive infrared (PIR), sound detection, or any of various alternatives as are known in the art. The sensor 22 further employs a transmitter 24 compatible with the receivers 20 integrated in the light fixture 12. The occupancy sensor 22 is capable of being assigned a zone (or channel), and has a unique address. In one example, the address is set at the factory (i.e., transparent to an end user), but in various embodiments the address may be configurable by the end user. The occupancy sensor 22 may include a microcontroller, although such is not required within the scope of a lighting control method as described in the present embodiment.

The system is targeted for small-to-medium installations but could be implemented in larger installations, as well. While infrared, ultrasonic or even audible control could be the medium for communication, an exemplary system will be described herein using Radio Frequency (RF).

In various embodiments, a preferred transmission protocol includes point-to-point/multi-point network, rather than mesh networking. This may facilitate ease in troubleshooting and lower cost of implementation. However, the approach could be implemented over a mesh network, if desired.

Two exemplary methods are now described for assigning external controllers, such as occupancy sensors, to lighting fixtures.

In a first Zone/Channel technique, a lighting fixture has the capability of being assigned a zone (or channel). The number of zones may typically depend on the practical bandwidth of the transmission medium and technology employed. The ISM band, 902 MHz-928 MHz, for example, will provide 26 MHz of bandwidth. The transmission capacity of this bandwidth will vary depending on the wireless protocol employed: CDMA-FH, TDMA, etc. The zone can be set in a variety of ways—by hardware (DIP switch, rotary dial, connected programmer (software)) or via wireless link (Bluetooth, IR, etc.).

As mentioned previously, the lighting fixture also includes a microcontroller, either integrated with the source driver/ballast 16 or discrete in nature. The information from the receiver is passed to the microcontroller for processing. The lighting fixture is configured to respond to a number (one or more) of external controllers. The setting for the number of occupancy sensors/external controllers (Cset) will be equal to the number of controllers that will control the particular lighting fixture. Cset can be set in a variety of ways—for example, by hardware (DIP switch, rotary dial, connected programmer (software)) or via wireless link (Bluetooth, IR, etc.).

In a second technique, operation is the similar to the Zone or Channel technique, except rather than relying on a zone the lighting fixture is assigned to only respond to a given set of addresses. Assignment is performed during a defined mode of operation, by pressing a switch on the external controllers and on the light fixtures to put them in a Pairing Mode (51). The controllers will broadcast a special pairing message that contains the respective unique addresses (52). The light fixture will store all of the unique addresses it will use in calculating Cset (53). The Assignment Mode or Pairing Mode automatically lapses after a short period of time 54). This second technique may be desirable to avoid cross talk with systems in close proximity on the same channel.

Respective to either of the techniques described above, an operating mode as described herein may be performed, wherein the occupancy sensors transmit output signals representative of determined occupancy to the receivers of the light fixture (55). The light fixture counts the number of controllers from which output signals have been received (56). At the end of a predetermined time period (57), the light fixture regulates a lighting state for respective light sources based on an occupancy condition as determined based on output signals from a number of the associated external controllers/occupancy sensors with respect a total number of such controllers (58).

In one embodiment, during occupancy the controllers do not transmit and the lighting fixtures retain the desired state, in one example, full bright (59b). When the target space is unoccupied, the controllers transmit. This transmission includes the unique address and assigned zone. When the lighting fixture receives transmissions representing the assigned zone from ALL of the assigned controllers, the fixture transitions to the second state, in this same example meaning a dimmed lighting state (59a). The transmission is periodic and continues until occupancy is sensed. The lighting fixture immediately transitions to the previous state (in this example, full bright) when the number of unique transmissions received falls below the number of controllers assigned (Cset).

In one example, a lighting system as disclosed herein is deployed in a 15,000 square foot parking garage, having three levels each with 5,000 square feet. Each of the three levels will represent a unique zone (e.g., Zone A). When occupancy is detected in a given zone, the lighting fixtures associated with that zone are activated (activated means moving from off to full bright, dim to full bright, etc. It encompasses any transition from one state to another that might occur). When the zone is unoccupied, the zone will transition to the original state.

Detecting an occupancy condition in the defined area, i.e., wherein the number of controllers submitting output signals is C−1 or less than the total number of controllers Cset, as quickly as possible needs to be balanced with respect to possible wireless transmission collisions from each of the controllers. Transmission time versus duty cycle may be relatively short so as to make collisions unlikely, but in order to reduce the likelihood even further a pseudo random time between transmissions can be used so that when a collision occurs it is unlikely to occur on the next transmission.

The previous detailed description has been provided for the purposes of illustration and description. Thus, although there have been described particular embodiments of an invention, it is not intended that such references be construed as limitations upon the scope of this invention except as set forth in the following claims.

What is claimed is:

1. A lighting system comprising:
   a light fixture including a light source and a controller;
   a plurality of occupancy sensors associated with the light fixture, wherein each occupancy sensor is configured to generate output signals only upon determining no occupancy in a defined area;
   the controller for the light fixture is configured to
      count a number of occupancy sensors from which output signals are received during each of sequential predetermined time windows,
      operate the light source in a first lighting state comprising a disabled or dimmed lighting output upon identifying output signals as received from each of a predetermined number of associated occupancy sensors within a particular predetermined time window, and
      operate the light source in a second lighting state comprising a full lighting output upon identifying output signals as received from less than the predetermined number of associated occupancy sensors within the predetermined time window.

2. The lighting system of claim 1, wherein:
   in a pairing mode, each of the plurality of occupancy sensors respectively generate a message comprising a unique address, and the controller for the light fixture identifies each of the occupancy sensors as being associated with the light fixture based upon the addresses received during the pairing mode; and
   in an operating mode, the occupancy sensors generate the output signals representative of occupancy in the defined area, and the light fixture operates the light source in the first or second lighting states based on the identified output signals from associated occupancy sensors.

3. The lighting system of claim 2, wherein each of the occupancy sensors respectively is configured to transmit the output signals according to a pseudo-random time interval.

4. The lighting system of claim 2, wherein the light fixture is configured to continuously determine identification of each associated occupancy sensor within each of sequential predetermined time windows.

5. The lighting system of claim 4, wherein a transmission protocol for the occupancy sensors comprises a point-to-point wireless network.

6. The lighting system of claim 4, wherein a transmission protocol for the occupancy sensors comprises a mesh network.

7. The lighting system of claim 1, wherein the light fixture is programmed for a particular lighting zone, and identifies output signals as received from occupancy sensors assigned to the same lighting zone.

8. The lighting system of claim 7, the light fixture comprising a hardware interface configured to selectably define a lighting zone for the light fixture.

9. The lighting system of claim 7, the light fixture comprising a hardware interface configured to selectably define a number of occupancy sensors in the lighting zone and associated with the light fixture.

10. The lighting system of claim 9, wherein the controller for the light fixture is configured to count a number of occupancy sensors from which output signals are received, and to compare the number against the defined number of associated occupancy sensors in the lighting zone in order to determine an appropriate lighting state for the light fixture.

11. A lighting control method comprising:
initiating a pairing mode for each of one or more light fixtures and a plurality of occupancy sensors in a defined area, wherein the occupancy sensors transmit messages to the light fixture comprising respective unique addresses;
during the pairing mode, identifying at each light fixture the respective addresses for each occupancy sensor in the defined area;
upon lapsing of a time period associated with the pairing mode, initiating an operating mode during which the occupancy sensors transmit output signals only upon determining no occupancy in the defined area;
during the operating mode, counting a number of output signals that are transmitted and received at a given light fixture during each of sequential predetermined time windows;
providing a disabled or dimmed lighting output from the given light fixture when the counted number of received output signals matches a predetermined number of occupancy sensors within a particular predetermined time window, and
providing a full lighting output from the given light fixture when the counted number of received output signals is less than the predetermined number of occupancy sensors within the predetermined time window.

12. The lighting control method of claim 11, further comprising transmitting the output signals during the operating mode according to pseudo-random time intervals.

13. A lighting system comprising:
a light fixture including a light source and a controller;
a plurality of occupancy sensors, each configured to generate output signals only upon determining no occupancy in a defined area;
the controller for the light fixture is configured to
count a number of output signals received during each of sequential predetermined time windows,
operate the light source in a first lighting state comprising a disabled or dimmed lighting output when the counted number of received output signals matches a predetermined number of occupancy sensors within a particular predetermined time window, and
operate the light source in a second lighting state comprising a full lighting output when the counted number of received output signals is less than the predetermined number of occupancy sensors within the predetermined time window.

* * * * *